49-381
AI 00110
EXAMINED
AI 00110
S. G. Dugdale,
Automatic Gate,
A. I. Mar. 7. 1854.
No. 110.
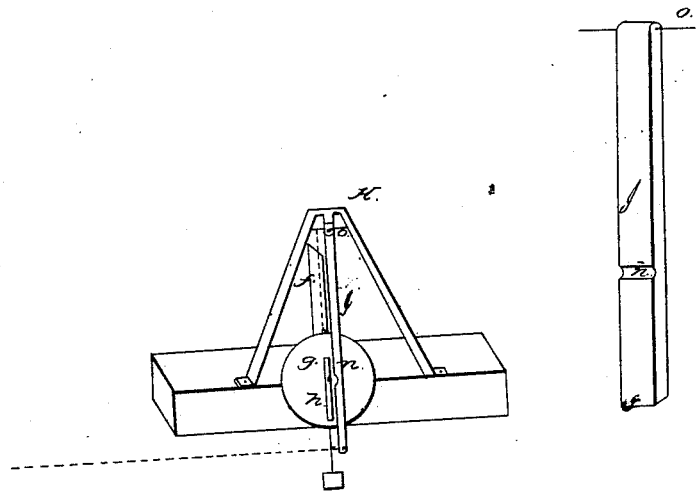
Witnesses.
S. M. Lynn
John Finley.
Inventor.
Samuel G. Dugdale
N. PETERS, PHOTO-LITHOGRAPHER, WASHINGTON, D.C.